United States Patent
Bacon

(10) Patent No.: US 7,516,826 B2
(45) Date of Patent: Apr. 14, 2009

(54) ELECTRO-SLIP CLUTCH

(75) Inventor: Philip Hart Bacon, Hamden, CT (US)

(73) Assignee: Custom Products Corporation, North Haven, CT (US)

( * ) Notice: Subject to any disclaimer, the term of this patent is extended or adjusted under 35 U.S.C. 154(b) by 179 days.

(21) Appl. No.: 11/271,717

(22) Filed: Nov. 9, 2005

(65) Prior Publication Data
US 2007/0102256 A1 May 10, 2007

(51) Int. Cl.
*F16D 27/115* (2006.01)
(52) U.S. Cl. .............. 192/84.2; 192/84.91; 192/84.961; 192/110 B; 192/56.41; 192/84.93
(58) Field of Classification Search .............. 192/56.41, 192/84.2, 84.91, 94.93
See application file for complete search history.

(56) References Cited
U.S. PATENT DOCUMENTS

| | | | | |
|---|---|---|---|---|
| 2,847,102 A * | 8/1958 | Tiedeman et al. | ........ | 192/84.91 |
| 4,852,706 A * | 8/1989 | Pietrzak et al. | .......... | 192/223.1 |
| 4,880,407 A | 11/1989 | Carton-Bacon | .............. | 464/43 |
| 4,895,051 A * | 1/1990 | Weiss et al. | .................. | 475/150 |
| 5,105,928 A * | 4/1992 | Saeki et al. | .............. | 192/84.93 |
| 5,163,541 A | 11/1992 | Bacon | .......................... | 192/76 |
| 6,725,994 B2 | 4/2004 | Bacon | .......................... | 192/223 |
| 2005/0279607 A1 * | 12/2005 | Fusegi | ..................... | 192/84.96 |

* cited by examiner

*Primary Examiner*—Charles Marmor
*Assistant Examiner*—Edwin A Young
(74) *Attorney, Agent, or Firm*—Cantor Colburn LLP

(57) ABSTRACT

An electro-slip clutch may include a friction stack for receiving input rotation from an input shaft and a surrounding hub and for attaching to an output member. A bearing surface may be provided adjacent the friction stack and a solenoid may further be provided. The solenoid may include a plunger in a first position pressing against the bearing surface with a first degree of force and in a second position different than the first position relative to the bearing surface. Thus, torque transmitted through the friction stack is adjustable by the solenoid. A method of operating a clutch mechanism may include providing a solenoid adjacent a friction stack and providing a first current level to the solenoid, the first current level energizing a coil of the solenoid and pushing a plunger within the solenoid towards the friction stack with a first degree of force.

28 Claims, 3 Drawing Sheets

ELECTRO-SLIP CLUTCH

BACKGROUND

This invention relates generally to clutches, and more particularly, this invention relates to a slip clutch for intermittent, continuous, or overload slip, or for braking.

Slip clutch mechanisms of various constructions are used in many applications to couple a driving shaft to a driven shaft or other device, and to limit the transmitted torque. They may also be used in or as hinges to hold one device in a predetermined angular position with respect to another device, for example, the lid of a case for a laptop computer. In the latter type of uses, the slip clutches provide the function of brakes.

The prior art discloses many different slip clutch constructions using various spring arrangements to establish a slip torque between a driving and driven member to thereby limit the torque transmitted.

Some of these prior art devices are relatively complicated, requiring a large number of parts and helical springs and most are limited in the slip torque range they can provide. Also, there is a constant demand of organizations using small slip clutches for a more economical device.

BRIEF SUMMARY

Disclosed herein, in an exemplary embodiment, is a mechanism useful as a slip clutch or brake, the mechanism including a friction stack for receiving input rotation and for attaching to an output member, a bearing surface adjacent the friction stack, and a solenoid having a plunger in a first position pressing against the bearing surface with a first degree of force and in a second position different than the first position relative to the bearing surface. Torque transmitted through the friction stack is adjustable by the solenoid.

In another exemplary embodiment, a method of operating a clutch mechanism may include providing a solenoid adjacent a friction stack of the clutch mechanism and providing a first current level to the solenoid, the first current level energizing a coil of the solenoid and pushing a plunger within the solenoid towards the friction stack with a first degree of force.

BRIEF DESCRIPTION OF THE DRAWINGS

The embodiments will now be described, by way of an example, with references to the accompanying drawings, wherein like elements are numbered alike in the several figures in which.

DETAILED DESCRIPTION OF EXEMPLARY EMBODIMENTS

Mechanisms of the disclosed embodiments may be utilized as torque limiting slip clutches or as a brake or holding device, as previously pointed out. However, for purposes of disclosure, the mechanism will primarily be referred to as a slip clutch.

The slip clutch may control torque for intermittent, continuous, or overload slip. It may drive in both directions, slip when the torque setting is reached, and resume driving as the load is reduced. Slip clutches may function as continuous or intermittent drag brakes, protection against overloads, for "soft starts", slip at the end of a stroke, as friction hinges, for screwing on container caps, etc.

Figure 1:
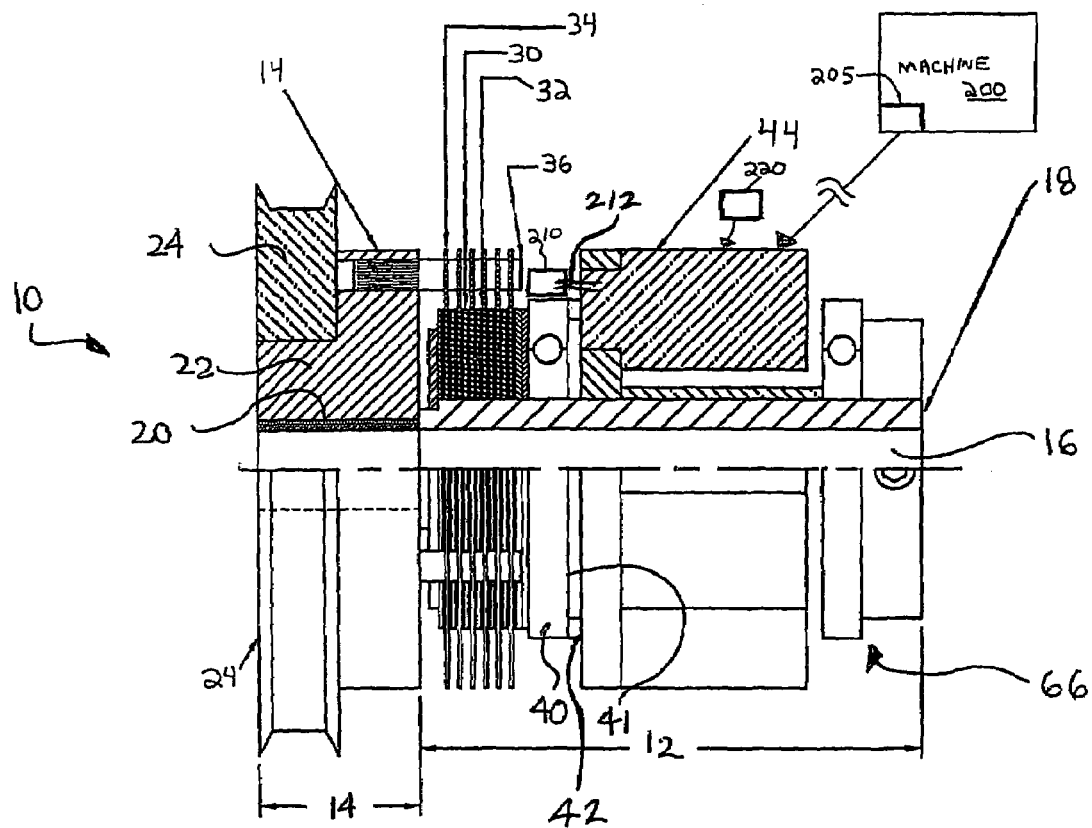
FIG. 1 is a side cross-sectional view of an electro-slip clutch using a plurality of solenoids.

Turning to FIG. 1, a slip clutch mechanism 10 may include two assemblies, a cartridge assembly 12, and a housing assembly 14. An input shaft 16 may pass through the cartridge assembly 12 as shown. The input shaft 16 may be surrounded by a hub 18 within the cartridge assembly 12. In one embodiment, the input shaft 16 may also pass through the housing assembly 14 with a bearing 20, such as a bronze bearing, provided within the housing assembly 14 to allow relative motion between the input shaft 16 and an output gear 22 and pulley 24. Although a bronze bearing is specifically described, it should be understood that alternate elements for allowing motion between the input shaft 16 and output gear 22 may also be used. It should also be understood that an output gear 22 and output pulley 24 are not the only possible output mechanisms. That is, other output mechanisms, such as an output shaft that is set screwed or keyed to the housing 14 may be provided in lieu of the input shaft 16 passing all the way through the housing 14. Alternate output mechanisms within the housing 14 are also within the scope of these embodiments.

Figure 2:
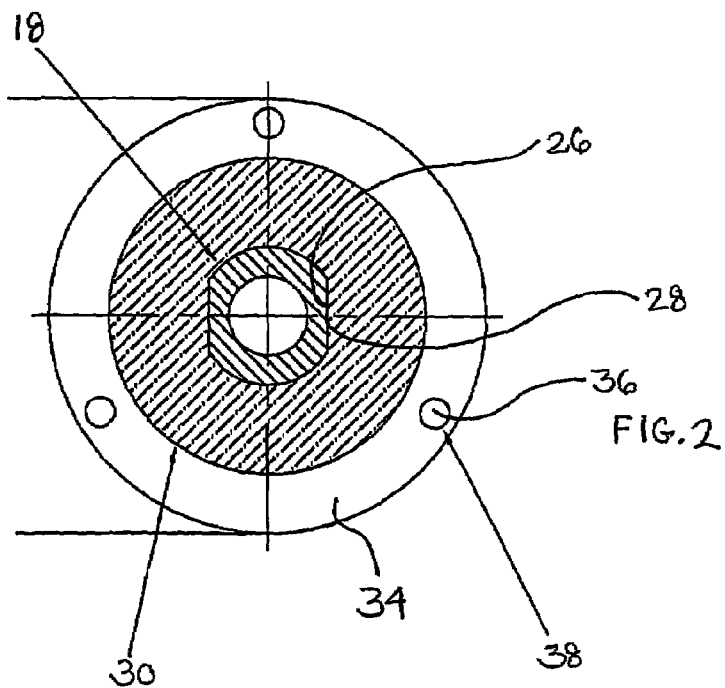
FIG. 2 is a front cross-sectional view of a hub, inner plate, and outer plate for use within the electro-slip clutch of FIG. 1.

As shown in FIG. 2, and with further reference to FIG. 1, the hub 18 may include flats 26 that may correspond to mating flats 28 on inner plates 30. With the inner plates 30 threaded on the hub 18, rotation of the inner shaft 16 is transmitted to the hub 18 and then subsequently transmitted to the inner plates 30. Torque is then transmitted from the inner plates 30, through friction pads 32, to the outer plates 34. The outer plates 34 connect wit the inner plates 30 via the friction pads 32. The inner diameter of the outer plates 34 is larger than an outer diameter of the hub 18 so that the outer plates 34 are not directly connected to the hub 18 and do not touch the hub 18. Thus, the inner plates 30 may be considered the "drive" plates, while the outer plates 34 may be considered the "driven" plates. The outer plates 34 may be keyed to torque pins 36 that pass through the outer plates 34 as well as an output member, such as the output gear 22 as shown. The torque pins 36 may pass through torque pin apertures 38 provided within an outer periphery of the outer plates 34. While three equally spaced torque pin apertures 38 are shown within an outer plate 34 for accepting three torque pins 36, it should be understood that an alternate number of torque pins 36 and corresponding number of torque pin apertures 38 within the outer plates 34 may be provided, so long as the number of torque pins 36 allows for an adequate transmission of torque from the outer plates 34 to the output member, such as output gear 22. The outer plates 34 may have an outer diameter that is greater than an outer diameter of the inner plates 30, and the outer and inner plates 34, 30 are concentric about a longitudinal axis of the input shaft 16. The clutch housing 14 maintains the outer plates 34 concentric with the rest of the clutch. The torque pin apertures 38 may be located within the outer periphery ring of the outer plates 34 that extends beyond the outermost periphery of the inner plates 34.

As described above, torque is transmitted from the inner plates 30 through the friction pads 32 to the outer plates 34. The friction pads 32 may provide the slip clutch 10 with the ability to "slip". While friction pads 32 are disclosed, it should be understood that friction pads 32 are not required. The clutch may function with just the inner plates 30 rubbing against the outer plates 34. Friction pads 32, however, provide the slip clutch mechanism 10 with improved control of the torque and greater wearability. A bearing 40 having a bearing surface 41 may be provided adjacent the set of inner plates 30, outer plates 34, and friction pads 32 sandwiched in between the inner and outer plates 30, 34. The bearing surface 41 may be pushed with a selected degree of force by a plunger 42 of a solenoid 44. There may be a plurality of solenoids 44 that may be evenly spaced about the input shaft 16 and that may include an equal number of plungers 42. In one embodiment, there may be six solenoids evenly spaced apart and radially spaced about the longitudinal axis 16 with six plungers 42 extending from the solenoids 44 for pushing against the bearing surface 41. In other embodiments, alternate numbers of solenoids 44 may be provided. While plungers 42 are described as pushing directly against the bearing surface 41, it should be understood that pushing surfaces may be provided about the bearing surface 41, such as, but not limited to, protrusions extending from the bearing surface 41, such that the plungers 42 from the solenoids 44 may push against the pushing surfaces provided on the bearing surface 41.

A solenoid is a device that may convert electrical energy into mechanical energy. A solenoid may include a conductive coil that wraps around a plunger made of a magnetic substance. When the solenoid is in an "open" position, the plunger is either located outside of the coil, or to one longitudinal end of the coil if the plunger is limited in movement by the solenoid housing. When current flows through the solenoid coil, the magnetic field that is produced magnetizes the coil, or a frame supporting the coil, and attracts the mobile plunger, so the plunger may then be pulled into the empty space within the coil. The motion produced by the moving plunger may be harnessed to provide mechanical energy.

Figure 3:
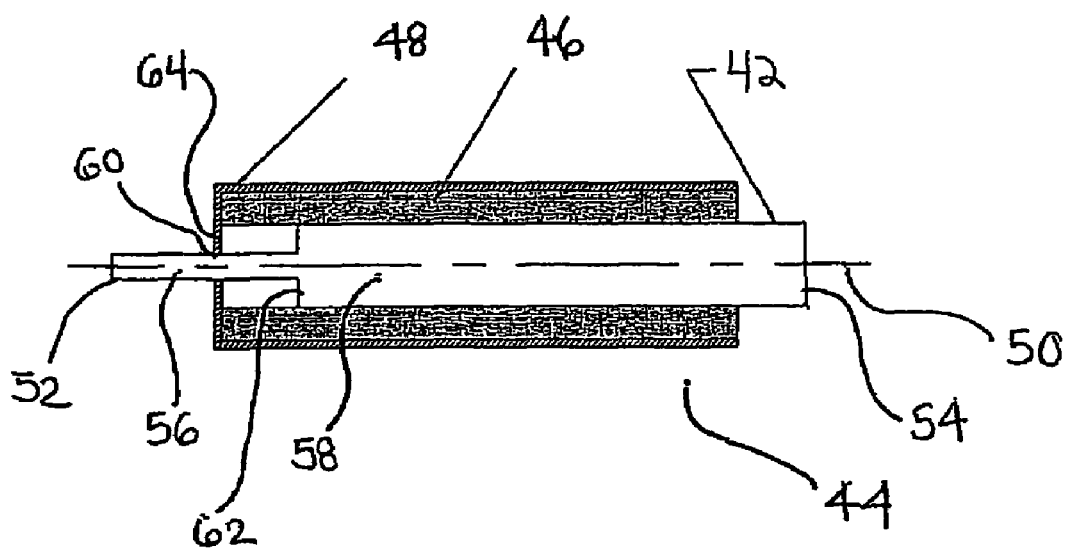
FIG. 3 is a side cross-sectional view of a solenoid for use with the clutch of FIG. 1; and, FIG. 4 is a side cross-sectional view of an electro-slip clutch using a single hollow solenoid.

FIG. 3 shows a larger view of the solenoid 44. The solenoid 44 includes the plunger 42 surrounded by a coil 46. The coil 46 may be protected by a frame 48. The solenoid 44 may have a longitudinal axis 50. The plunger 42 and the coil 46 may share the same longitudinal axis 50. The plunger 42 may include a first end 52 that may push up against the bearing surface 41 and a second end 54. The first end 52 may be part of a first portion 56 that has a smaller diameter than the second portion 58. The frame 48 may have an opening 60 sized for allowing the passage of the first portion 56 of the plunger 42. A landing 62 on the plunger 42 may be provided between the first portion 56 and the second portion 58. When the solenoid 44 is energized, the landing 62 may abut against the wall 64 of the frame 48 that surrounds the opening 60. Thus, the wall 64 may limit the amount of force that the plunger 42 will press upon the bearing surface 41. A plunger 42 having a longer first portion 56 may be able to provide a greater force upon the bearing surface 41 than a plunger 42 having a shorter first portion 56.

The solenoids 44 may be provided with a solenoid actuator 210 having wires 212 connecting to the solenoids 44 for actuating the solenoids 44. All of the solenoids 44 may be energized by a common solenoid actuator. The solenoid actuator 210 may be seated on the bearing 40 so that it does not spin with the slip clutch. Alternatively, the solenoid actuator 210 may be provided with brush contacts so that it may be positionable upon a rotatable portion of the slip clutch. When the solenoid actuator 210 actuates the solenoid 44, the plunger 42 may push towards the bearing surface 41 and press the bearing 40 against the set of inner plates 30, outer plates 34, and friction pads 32. More pressure from the solenoids 44 increases the torque required to slip the clutch. When the clutch is acting as a brake, more pressure provides more braking torque.

The solenoids 44 may be actuated manually, such as by a switch or variable power source, or automatically, depending on the needs of the machine 200 utilizing the slip clutch mechanism 10. For example, in a winding operation, a sensor 205 may determine the tension on a web, and vary the current to the clutch to maintain the tension within certain limits as the diameter of the supply changes. It should be understood that the electro-slip clutch is adjustable in varying degrees and that different current levels may provide different levels of force for the moving plunger 42. Thus, the solenoids 44 may provide varying levels of pressure on the torque plates, that is, inner and outer plates 30 and 34. A thrust collar 66 and corresponding set screw may be provided upon the hub 18 to provide adjustment to the slip clutch mechanism 10 as the clutch friction elements wear. The thrust collar 66 may also provide support so that the solenoid plungers 42 may put pressure to the friction stack including the inner and outer plates 30, 34 and friction pad 32. Without the thrust collar 66, the solenoids may push away from the friction stack, rather than exerting pressure on the stack. The thrust collar 66 may force the coils and coil supports to exert pressure on the stack because the thrust collar 66 may prevent them from moving away from them.

Figure 4:
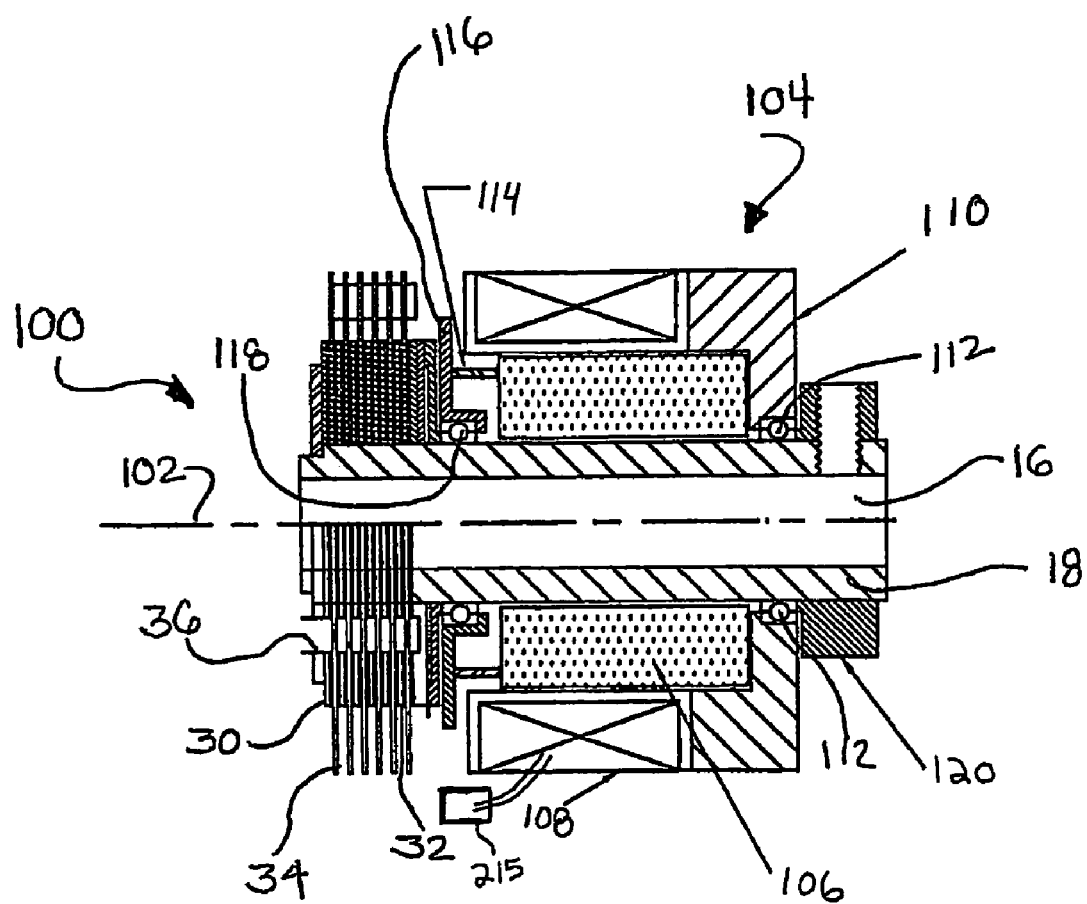

Turning now to FIG. 4, an alternate embodiment of a cartridge assembly for a slip clutch mechanism is shown. While the previous embodiment showed a plurality of solenoids spaced apart the longitudinal axis of the input shaft 16, the slip clutch mechanism 100 may include a single solenoid 104 having a hollow magnetic plunger 106 sharing a longitudinal axis 102 with the input shaft 16. The plunger 106 may be surrounded by a coil 108 that surrounds the plunger 106 and that may also share the longitudinal axis 102. A coil support 110 may be provided for the coil 108 and may be non-magnetic. Bearings 112 may be provided between the hub 18 and the coil support 110 for allowing the hub 18 to rotate independently of the coil support 110. When a solenoid actuator 215 energizes the coil 108, the plunger 106 may be pushed towards a pusher 114 that extends from a bearing surface 116. The bearing surface 116 is adjacent the sandwich containing the outer plates 34, inner plates 30, and friction pads 32. Bearings 118 may be provided between the bearing surface 116 and the hub 18 so that the hub 18 may move independently of the bearing surface 116. The bearing surface 116 provides varying pressure against this sandwich depending on the force or lack of force provided by the position of the plunger 106 relative to the pusher 114. The slip clutch mechanism 100 may further be provided with a thrust collar 120, similar to thrust collar 66 of FIG. 1.

A method of operating a clutch mechanism may be envisioned using the described clutch mechanism. Such a method may entail providing a solenoid adjacent a friction stack of the clutch mechanism and providing a first current level to the solenoid, the first current level energizing a coil of the solenoid and pushing a plunger within the solenoid towards the friction stack with a first degree of force. The method may further include adjusting the current level depending on requirements of a machine 200 in which the clutch mechanism is utilized. The method may further include providing a sensor 205 within the machine 200 to detect a function condition, sensing the function condition, and adjusting the current level automatically in response to sensor input. The method may further include providing a remotely adjustable switch 220, and adjusting the current level remotely from the clutch mechanism. The method may further include utilizing elements within the clutch mechanisms of FIGS. 1 and 4 in a manner previously set forth in the description of these clutch mechanisms.

Thus, embodiments of clutch mechanisms have been described that include one or more solenoids for exerting pressure on a bearing surface that in turn exerts pressure on a friction stack, or sandwich, of inner and outer plates. In one embodiment, a plurality of solenoids may be spaced apart and distributed about the hub. In another embodiment, a single hollow solenoid may be provided that includes a plunger concentrically surrounding the hub. In either case, when the coil or coils become energized, the plunger or plungers move towards and exert pressure upon the bearing surface. The solenoids may be actuated manually or automatically, and thus provide improvements over springs. The solenoids may also be adjusted while the clutch is in motion, or adjusted via a remote control. By alternating between full current and no current, the clutch may operate as an engage/disengage clutch. Varying levels of current may also affect the slip level of the clutch.

While the invention has been described with reference to an exemplary embodiment, it will be understood by those skilled in the art that various changes may be made and equivalents may be substituted for elements thereof without departing from the scope of the invention. Terms such as "first" and "second" are used herein merely to distinguish between two like elements, and are not intended to imply an order such as of importance or location. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A mechanism useful as a slip clutch or brake, comprising:
   a friction stack for receiving input rotation and for attaching to an output member;
   a bearing surface adjacent the friction stack;
   a solenoid having a plunger in a first position pressing against the bearing surface with a first degree of force and in a second position different than the first position relative to the bearing surface;
   an input shaft for providing torque to a drive plate within the friction stack, wherein the plunger and the input shaft share a common longitudinal axis; and
   bearings disposed between the bearing surface and the input shaft so that the bearings allow relative rotation between the bearing surface and the input shaft;
   wherein torque transmitted through the friction stack is adjustable by the solenoid.

2. The mechanism of claim 1 further comprising a plurality of solenoids spaced apart relative to the bearing surface.

3. The mechanism of claim 1 further comprising a pusher extending from the bearing surface, wherein the plunger engages with the pusher in the first position.

4. The mechanism of claim 1 wherein the plunger is hollow.

5. The mechanism of claim 4 wherein the plunger shares a longitudinal axis with the friction stack.

6. The mechanism of claim 1 further comprising the output member, wherein the output member is a gear connected to the friction stack and a pulley connected to the gear.

7. The mechanism of claim 1 wherein the first position corresponds to the solenoid being energized, and the second position corresponds to the solenoid being de-energized.

8. The mechanism of claim 7 further comprising the output member, wherein the output member is a gear connected to the friction stack and a pulley connected to the gear.

9. The mechanism of claim 7 wherein a position of the plunger of the solenoid is determined remotely.

10. The mechanism of claim 1 wherein a position of the plunger of the solenoid is determined remotely.

11. A mechanism useful as a slip clutch or brake, comprising:
    a friction stack for receiving input rotation and for attaching to an output member;
    a bearing surface adjacent the friction stack;
    a solenoid having a plunger in a first position pressing against the bearing surface with a first degree of force and in a second position different than the first position relative to the bearing surface, wherein torque transmitted through the friction stack is adjustable by the solenoid;
    a coil surrounding the plunger, wherein the coil is magnetized upon activation by a solenoid actuator; and
    a coil support for supporting the coil, an input shaft for providing torque to a drive plate within the friction stack, a hub for transmitting the torque from the input shaft to the drive plate, and a bearing for allowing the hub to move independently of the coil support.

12. The mechanism of claim 11 wherein the friction stack includes a drive plate receiving input rotation and a driven plate receiving torque from the drive plate, the driven plate for attaching to the output member.

13. The mechanism of claim 12 further comprising an input shaft for providing input rotation to the drive plate.

14. The mechanism of claim 13 further comprising a hub surrounding the input shaft, the hub transmitting torque from the input shaft to the drive plate.

15. The mechanism of claim 14 further comprising bearings disposed between the bearing surface and the hub so that the bearings allow relative rotation between the beam surface and the hub.

16. The mechanism of claim 14 wherein the hub includes flat surfaces that mate with flat surfaces of the drive plate.

17. The mechanism of claim 12 wherein the driven plate includes a torque pin aperture for receiving a torque pin, wherein the torque pin is connected to the output member.

18. The mechanism of claim 12 further comprising a friction pad sandwiched between the drive plate and the driven plate.

19. The mechanism of claim 12 further comprising a plurality of drive plates and a plurality of driven plates, each of the drive plates separated from a driven plate by a friction pad.

20. The mechanism of claim 11 wherein, upon providing the solenoid with a first current level, the plunger exerts a first force upon the bearing surface, and upon providing the solenoid with a second current level, less than the first current level, the plunger exerts a second force upon the bearing surface, the second force less than the first force.

21. The mechanism of claim 20 wherein the current level provided to the solenoid is adjusted automatically as determined by a sensor within a machine that utilizes the mechanism.

22. The mechanism of claim 20 wherein a current level provided to the solenoid is adjusted remotely from the mechanism.

23. The mechanism of claim 11 further comprising the output member, wherein the output member is a gear connected to the friction stack and a pulley connected to the gear.

24. The mechanism of claim 11 wherein a position of the plunger of the solenoid is determined remotely.

25. A method of operating a clutch mechanism, the method comprising:
    providing a solenoid adjacent a friction stack of the clutch mechanism, the solenoid having a plunger and a coil surrounding the plunger;

providing one of a first current level and a second current level to the solenoid, the first current level corresponding to the solenoid being energized and causing the plunger to be disposed in a first position, the second current level corresponding to the solenoid being de-energized causing the plunger to be disposed in a second position different than the first position, the first current level energizing a coil of the solenoid and pushing a plunger within the solenoid towards the friction stack to the first position with a first degree of force; and providing a coil support for supporting the coil, an input shaft for providing torque to a drive plate within the friction stack, a hub for transmitting the torque from the input shaft to the drive plate, and a bearing for allowing the hub to move independently of the coil support.

26. The method of claim 25 further comprising adjusting the current level depending on requirements of a machine in which the clutch mechanism is utilized.

27. The method of claim 26 further comprising providing a sensor within the machine to detect a function condition, sensing the function condition, and adjusting the current level automatically in response to sensor input.

28. The method of claim 26 further comprising providing a remotely adjustable switch, and adjusting the current level remotely from the clutch mechanism.

* * * * *